No. 752,222. PATENTED FEB. 16, 1904.
G. DE B. HAYES.
WHIFFLETREE HOOK.
APPLICATION FILED OCT. 13, 1903.
NO MODEL.

Witnesses
E. W. Stewart
C. N. Woodward.

George DeBreton Hayes,
Inventor.
by C. A. Snow & Co.
Attorneys

THE NORRIS PETERS CO., PHOTO-LITHO., WASHINGTON, D. C.

No. 752,222.

Patented February 16, 1904.

UNITED STATES PATENT OFFICE.

GEORGE DE BRETON HAYES, OF CHETEK, WISCONSIN.

WHIFFLETREE-HOOK.

SPECIFICATION forming part of Letters Patent No. 752,222, dated February 16, 1904.

Application filed October 13, 1903. Serial No. 176,921. (No model.)

*To all whom it may concern:*

Be it known that I, GEORGE DE BRETON HAYES, a citizen of the United States, residing at Chetek, in the county of Barron and State of Wisconsin, have invented a new and useful Whiffletree-Hook, of which the following is a specification.

This invention relates to devices for coupling traces to whiffletrees, and has for its object to improve the construction of such devices and increase the safety without increasing the expense or weight; and the invention consists in certain novel features of construction, as hereinafter shown and described, and specified in the claims.

Figure 4:
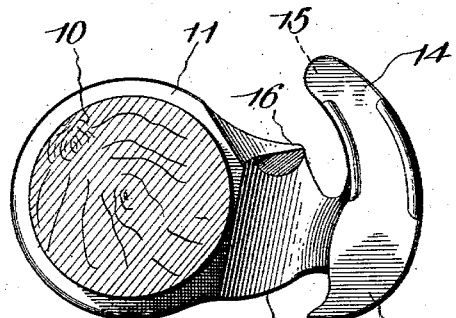
Figure 3:
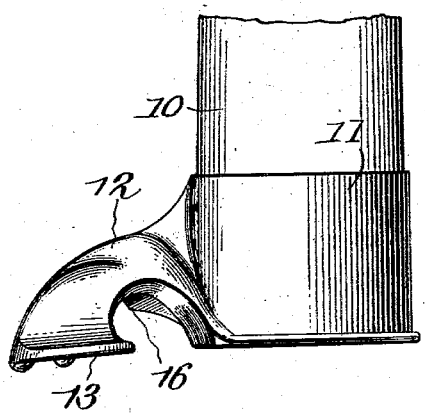
Figures 1, 2:
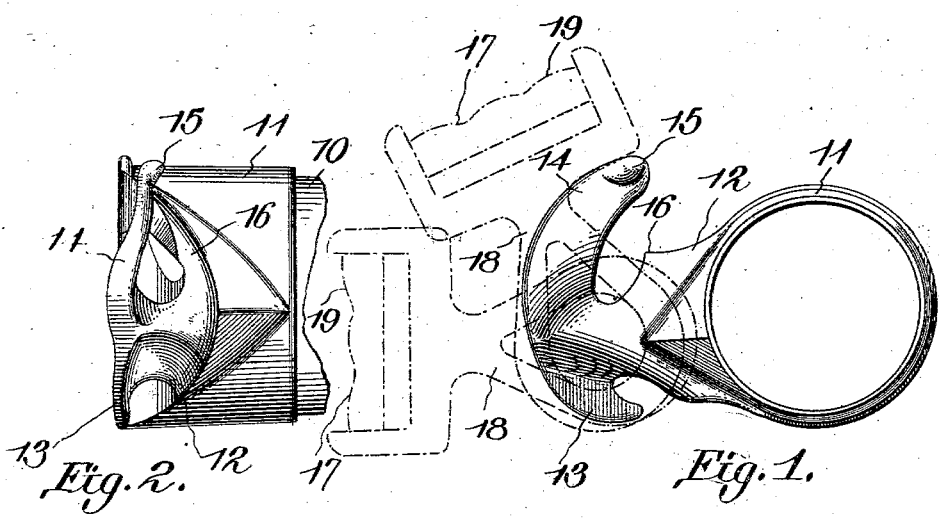

The improved devices are produced "rights" and "lefts;" but as they are precisely alike, except that the parts are reversely disposed, one only of the devices is shown for illustration, and in the drawings illustrative of the invention, in which corresponding parts are denoted by like designating characters, Figure 1 is an end view of a whiffletree with the improved hook applied. Fig. 2 is a front view. Fig. 3 is a plan view of the same, and Fig. 4 is an end elevation looking inwardly.

The hook selected for illustrating the device is the right-hand one or the hook for the right-hand end of the whiffletree viewed from the driver's place on the vehicle.

The improved device may be attached to any size or form of whiffletree, but for the purpose of illustration is shown applied to one of ordinary circular form, as at 10.

The improved device consists of a ferrule 11, attached in the usual manner to the whiffletree and provided with a laterally-curving shank 12, extending therefrom and terminating in a T-shaped head, one arm, 13, of which is shorter than the other arm, 14, as shown. The arms 13 14 curve rearwardly toward the ferrule, and the longer arm is also inclined toward the curving portion of the shank and terminates in a lateral stop-lug 15. Extending from the shank 12 intermediately of its length is a stop-lug 16, as shown, the two stop-lugs 15 and 16 restricting the "throat" or inlet to the portion of the hook formed by the longer arm 14, as shown.

A portion of the trace is represented at 17, having a "cockeye" 18 of the ordinary form attached to its free end, the trace and cockeye being shown in dotted lines only to avoid obscuring parts of the hook. By this simple arrangement the cockeye can be coupled to the hook only by turning it into a horizontal position, threading its loop over the longer arm 14, then turning the cockeye into a vertical position to pass the lower portion of the loop-aperture over the shorter arm 13, then returning the cockeye to its operative position, as shown by dotted lines in Fig. 1. To detach the cockeye, the same movements are employed in reverse order.

So long as the strain is on the trace the cockeye will retain its horizontal position; but in event of the slackening of the trace the trace end of the cockeye will fall into the position shown by dotted lines at 19 in Fig. 1.

When employed upon loosely-hanging eveners and whiffletrees—such as those employed upon most forms of heavy draft-wagons, farm teams, and general teamwork—the longer hooks 14 will be placed upward, as shown, so that when the traces are slackened up the cockeyes hang downward and when the strain is again applied the stops 15 16 coact to prevent the cockeye rotating in the hook and becoming either entangled or detached, as it might otherwise do when severely shaken about. By providing the extension 15 16, however, all such danger is obviated and the cockeye will not be shaken loose, no matter how severely the parts may be shaken about in the course of the work.

While in use, the cockeye will never be thrown into a vertical position with the trace end upward, and as this position is the one into which it must be placed to release it it is evident the cockeye will never be released accidentally, as by jarring or being shaken about when the traces are slackened.

The construction is very simple, and the attachments can be constructed of malleable iron or steel and can be made durable and strong without increase of weight or expense.

Having thus described my invention, what I claim is—

1. A whiffletree-hook comprising a supporting member having a laterally-curved shank projecting therefrom, said shank being provided at its free end with a T-shaped head having arms of unequal length extending at right angles therefrom, both of said arms curving rearwardly toward the supporting member.

2. A whiffletree-hook comprising a supporting member having a laterally-curved shank projecting therefrom, said shank being provided at its free end with a T-shaped head having arms of unequal length each curving rearwardly toward the supporting member, and with the longer of said arms laterally inclined toward said curved shank.

3. An improved whiffletree-hook formed with a T-shaped head and laterally-curved shank, the arms of said head portion curving rearwardly and of unequal length and with the longer of said arms laterally inclined toward said curved shank and terminating in a stop-lug extending transversely of the arm, substantially as described.

4. An improved whiffletree-hook formed with a T-shaped head and laterally-curved shank having a depending stop-lug, the arms of said head portion curving rearwardly and of unequal length with the longer of said arms inclined toward said curved shank and the stop-lug depending therefrom, substantially as described.

5. An improved whiffletree-hook consisting of a ferrule for attachment to the whiffletree and having a laterally-curving shank extending therefrom and terminating in a T-shaped head, the arms of which are of unequal length and curving rearwardly toward the ferrule, substantially as described.

In testimony that I claim the foregoing as my own I have hereto affixed my signature in the presence of two witnesses.

GEORGE DE BRETON HAYES.

Witnesses:
F. A. SOUTHWORTH,
A. T. GALBY.